United States Patent
Koch et al.

(10) Patent No.: US 11,328,358 B2
(45) Date of Patent: *May 10, 2022

(54) SYSTEMS AND METHODS FOR CONTROLLING AN AUTOMATED ELECTRONIC NETWORKED CENTRAL CLEARINGHOUSE FOR NON-FUNGIBLE DIGITAL ASSETS

(71) Applicant: Mythical, Inc., Sherman Oaks, CA (US)

(72) Inventors: Rudy Koch, Seattle, WA (US); Cameron Thacker, Sherman Oaks, CA (US); Liwen Kao, Pasadena, CA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/085,790

(22) Filed: Oct. 30, 2020

(65) Prior Publication Data

US 2022/0036456 A1 Feb. 3, 2022

Related U.S. Application Data

(63) Continuation of application No. 16/944,765, filed on Jul. 31, 2020, now Pat. No. 10,861,095.

(51) Int. Cl.
*G06K 5/00* (2006.01)
*G06Q 40/04* (2012.01)
(Continued)

(52) U.S. Cl.
CPC .......... *G06Q 40/04* (2013.01); *A63F 13/792* (2014.09); *G06Q 20/023* (2013.01); *A63F 13/71* (2014.09);
(Continued)

(58) Field of Classification Search
CPC ...... G06Q 20/02; G06Q 40/04; G06Q 20/023; G06Q 20/12; G06Q 20/123; G06Q 20/36;
(Continued)

(56) References Cited

U.S. PATENT DOCUMENTS

| 6,085,169 | A | 7/2000 | Walker |
| 10,692,325 | B2 * | 6/2020 | Simons ............... G07F 17/3272 |

(Continued)

OTHER PUBLICATIONS

Game X coin launches first blockchain game platform: Korea-based startup aims to disrupt the video game industry with game cryptocurrency. (Aug. 2, 2018). NASDAQ OMX's News Release Distribution Channel (Year: 2018) Retrieved from https://search.proquest.com/wire-feeds/game-x-coin-launches-first-blockchain-platform/docview20/81459699/se-2?accountid=14753 (Year: 2018) (2 pages).
(Continued)

*Primary Examiner* — Thien M Le
(74) *Attorney, Agent, or Firm* — Esplin & Associates, PC

(57) ABSTRACT

Systems and methods for controlling an automated electronic networked central clearinghouse for clearing and reversing reversible exchanges of digital assets are disclosed. Exemplary implementations may: execute an instance of a game; receive an exchange request that indicates a first user offers a first digital asset for a reversible exchange on a fiat-currency-based online exchange platform; access a decentralized database to obtain asset-specific distribution rights for the first digital asset; generate publication information of the first digital asset for publication on the online exchange platform; receive exchange information regarding the reversible exchange; temporarily transferring the ownership of the first digital asset; determine whether to reverse the reversible exchange, and either (i) transfer the ownership of the first digital asset to the first user, or (ii) clear the reversible exchange by non-temporarily transfer-
(Continued)

ring the ownership to the exchanging user, and by distributing benefits in accordance with the asset-specific distribution rights.

20 Claims, 5 Drawing Sheets

(51) Int. Cl.
    *G06Q 20/02*     (2012.01)
    *A63F 13/792*     (2014.01)
    *A63F 13/71*     (2014.01)

(52) U.S. Cl.
    CPC . *A63F 2300/532* (2013.01); *A63F 2300/5513* (2013.01)

(58) Field of Classification Search
    CPC ............. G06Q 20/38215; A63F 13/792; A63F 2300/532; A63F 2300/5513; A63F 13/71
    See application file for complete search history.

(56) References Cited

U.S. PATENT DOCUMENTS

| | | | |
|---|---|---|---|
| 10,740,733 | B2 | 8/2020 | Moir |
| 10,850,202 | B1* | 12/2020 | Koch ................... G06Q 20/108 |
| 10,861,095 | B1* | 12/2020 | Koch ................... G06Q 20/389 |
| 10,872,367 | B1 | 12/2020 | Stoddard |
| 10,946,291 | B1 | 3/2021 | Harris |
| 10,984,400 | B1* | 4/2021 | Koch ................... G06Q 30/0623 |
| 11,062,284 | B1 | 7/2021 | Cunningham |
| 11,138,580 | B1* | 10/2021 | Koch ................... G06Q 20/389 |
| 2002/0123938 | A1 | 9/2002 | Yu |
| 2007/0087831 | A1 | 4/2007 | Van Luchene |
| 2011/0302037 | A1 | 12/2011 | Sutton-Shearer |
| 2012/0015699 | A1 | 1/2012 | Kalvachev |
| 2012/0030069 | A1 | 2/2012 | Garg |
| 2013/0110720 | A1 | 5/2013 | Rekhi |
| 2014/0335948 | A1 | 11/2014 | Jung |
| 2015/0170112 | A1 | 6/2015 | DeCastro |
| 2016/0292680 | A1 | 10/2016 | Wilson, Jr. |
| 2017/0083959 | A1 | 3/2017 | Bousis |
| 2017/0148264 | A1 | 5/2017 | Pichette |
| 2018/0078843 | A1* | 3/2018 | Tran ................... G09B 19/0038 |
| 2018/0114403 | A1 | 4/2018 | Jayachandran |
| 2018/0117447 | A1* | 5/2018 | Tran ................... G16H 10/60 |
| 2018/0204260 | A1 | 7/2018 | McGregor |
| 2018/0205740 | A1 | 7/2018 | Clark |
| 2018/0247191 | A1 | 8/2018 | Katz |
| 2018/0276630 | A1 | 9/2018 | Kim |
| 2019/0005595 | A1 | 1/2019 | Tautenhan |
| 2019/0205873 | A1 | 7/2019 | Kamalsky |
| 2019/0220836 | A1 | 7/2019 | Caldwell |
| 2019/0236605 | A1 | 8/2019 | McHale |
| 2019/0282906 | A1 | 9/2019 | Yong |
| 2019/0295371 | A1 | 9/2019 | Simons |
| 2019/0303892 | A1 | 10/2019 | Yantis |
| 2019/0311341 | A1 | 10/2019 | Rice |
| 2019/0340623 | A1 | 11/2019 | Rivkind |
| 2019/0354945 | A1 | 11/2019 | Mahajan |
| 2019/0361917 | A1 | 11/2019 | Tran |
| 2019/0386969 | A1 | 12/2019 | Verzun |
| 2020/0005284 | A1 | 1/2020 | Vijayan |
| 2020/0013048 | A1 | 1/2020 | Love |
| 2020/0026548 | A1 | 1/2020 | Huang |
| 2020/0074853 | A1 | 3/2020 | Miller |
| 2020/0097927 | A1 | 3/2020 | Groarke |
| 2020/0184041 | A1 | 6/2020 | Andon |
| 2020/0202668 | A1 | 6/2020 | Cotta |
| 2020/0211092 | A1 | 7/2020 | Sarin |
| 2020/0273048 | A1 | 8/2020 | Andon |
| 2020/0320623 | A1 | 10/2020 | McGrath |
| 2021/0073881 | A1 | 3/2021 | Stoddard |
| 2021/0118085 | A1* | 4/2021 | Bushnell ................ G06Q 50/34 |
| 2021/0279695 | A1* | 9/2021 | Rice ................... G06Q 30/0643 |

OTHER PUBLICATIONS

Zheng Qin, "Introduction to E-commerce", 2009, Springer, springer.com (Year: 2009), pp. 298-301.

Janice Podsada; "With Sales of Virtual Goods, The Reality Is Serious Revenue"; Jan. 7, 2009; Tribune Content Agency LLC (Year: 2009).

Game X coin launches first blockchain game platform: Korea-based startup aims to disrupt the video game industry with game cryptocurrency. (Aug. 2, 2018). NASDAQ OMX's News Release Distribution Channel (Year: 2018) Retrieved from https:// search.proquest.com/wire-feeds/game-x-coin-launches-first-blockchain-platform.

Siira, Erkki, et al. Designing and Implementing Common Market for Cross-Game Purchases between Mobile Games. Bled eConference. 2017. pp. 1-16.

* cited by examiner

SYSTEMS AND METHODS FOR CONTROLLING AN AUTOMATED ELECTRONIC NETWORKED CENTRAL CLEARINGHOUSE FOR NON-FUNGIBLE DIGITAL ASSETS

FIELD OF THE DISCLOSURE

The present disclosure relates to systems and methods for controlling an automated electronic networked central clearinghouse for clearing and reversing reversible exchanges of digital assets.

BACKGROUND

Online gaming platforms are known. Users of online gaming platforms exchanging digital in-game assets to other users is known. Monitoring certain actions such as winning, losing, and levelling up of users within online gaming platforms is known. Certain types of central clearinghouses for clearing, e.g., certain types of transactions may be known.

SUMMARY

One aspect of the present disclosure relates to a system configured for clearing and reversing reversible exchanges of digital assets. The system may include an online gaming platform, a decentralized database, an automated electronic networked central clearinghouse, and/or other components. The online gaming platform may be configured to host one or more games. The online gaming platform may include one or more processors configured by machine-readable instructions. The online gaming platform may be configured to execute, within an online gaming platform, an instance of a game to facilitate presentation of the game to users. The online gaming platform may be configured to implement in-game actions in the instance of the game in response to action requests for the in-game actions by the users. The presentation of the game may be based on views of the game that are determined during execution of the game. The users may include a first user that interacts with the online gaming platform. The decentralized database may be configured to implement a decentralized ledger. The decentralized database may include one or more processors configured by machine-readable instructions. The decentralized database may be configured to record rights pertaining to digital assets. The digital assets may include digital assets that are not fungible. The recorded rights may reflect ownership of a first digital asset by the first user. The first digital asset (i) may be usable within the online gaming platform, and (ii) may represent a three-dimensional in-game user-controllable character that can interact with other virtual items within the online gaming platform. The decentralized database may be configured to receive instructions to modify the recorded rights. The automated electronic networked central clearinghouse may be configured for clearing and reversing reversible exchanges of digital assets. The automated electronic networked central clearinghouse may include one or more processors configured by machine-readable instructions. The automated electronic networked central clearinghouse may be configured to receive, from the first user, an exchange request that indicates the first user offers the first digital asset for a reversible exchange on a fiat-currency-based online exchange platform. The automated electronic networked central clearinghouse may be configured to access the decentralized database to obtain asset-specific distribution rights for the first digital asset. The asset-specific distribution rights may designate rights for one or both of (i) a second user, and (ii) one or more stakeholders of the online gaming platform. The automated electronic networked central clearinghouse may be configured to determine expected benefits pursuant to the reversible exchange of the first digital asset, based on the asset-specific distribution rights for the first digital asset. The automated electronic networked central clearinghouse may be configured to transfer a notification to the first user pertaining to the expected benefits. The automated electronic networked central clearinghouse may be configured to generate publication information of the first digital asset for publication on the fiat-currency-based online exchange platform. The publication may offer the first digital asset for the reversible exchange on the fiat-currency-based online exchange platform. The automated electronic networked central clearinghouse may be configured to receive, from the fiat-currency-based online exchange platform, exchange information regarding the reversible exchange of the first digital asset for a benefit. The benefit may represent an amount of fiat currency that has been received by the fiat-currency-based online exchange platform from an exchanging user. The automated electronic networked central clearinghouse may be configured to receive reversibility information regarding one or more actions by the exchanging user. The automated electronic networked central clearinghouse may be configured to make a determination whether to reverse the reversible exchange. The determination may be based on received reversibility information. The automated electronic networked central clearinghouse may be configured to, responsive to the determination indicating a reversal of the reversible exchange, transfer a second set of instructions to the decentralized database. The automated electronic networked central clearinghouse may be configured to, responsive to the determination indicating no reversal of the reversible exchange, clear the reversible exchange by distributing a first part of the benefit to the first user and a second part of the benefit to one or both of the second user and the one or more stakeholders of the online gaming platform in accordance with the asset-specific distribution rights.

Another aspect of the present disclosure relates to a method for controlling an automated electronic networked central clearinghouse for clearing and reversing reversible exchanges of digital assets. The method may include executing, within an online gaming platform, an instance of a game to facilitate presentation of the game to users, and implementing in-game actions in the instance of the game in response to action requests for the in-game actions by the users, wherein the presentation of the game is based on views of the game that are determined during execution of the game, wherein the users include a first user that interacts with the online gaming platform. The method may include receiving, from the first user, an exchange request that indicates the first user offers a first digital asset for a reversible exchange on a fiat-currency-based online exchange platform. The first digital asset may be usable within the online gaming platform. The method may include accessing a decentralized database to obtain asset-specific distribution rights for the first digital asset. The decentralized database may implement a decentralized ledger that records rights pertaining to digital assets, including digital assets that are not fungible. The recorded rights may reflect ownership of the first digital asset by the first user. The asset-specific distribution rights may include rights for one or both of (i) a second user, and (ii) one or more stakeholders of the online gaming platform. The method may include determining expected benefits pursuant to the reversible exchange of the first digital asset, based on the asset-specific distribution rights for the first digital asset. The method may include transferring a notification to the first user pertaining to the expected benefits. The method may include generating publication information of the first digital asset for publication on the fiat-currency-based online exchange platform. The publication may offer the first digital asset for the reversible exchange on the fiat-currency-based online exchange platform. The method may include receiving, from the fiat-currency-based online exchange platform, exchange information regarding the reversible exchange of the first digital asset for a benefit. The benefit may represent an amount of fiat currency that is received by the fiat-currency-based online exchange platform from an exchanging user. The method may include temporarily transferring the ownership of the first digital asset to the exchanging user, such that the recorded rights on the decentralized ledger no longer reflect the ownership of the first digital asset by the first user. The method may include making a determination whether to reverse the reversible exchange. The determination may be based on reversibility information received from the exchanging user. The method may include, responsive to the determination indicating a reversal of the reversible exchange, transferring the ownership of the first digital asset to the first user, such that the recorded rights on the decentralized ledger reflect the ownership of the first digital asset by the first user. The method may include, responsive to the determination indicating no reversal of the reversible exchange, clearing the reversible exchange by non-temporarily transferring the ownership of the first digital asset to the exchanging user, such that the recorded rights on the decentralized ledger reflect the ownership of the first digital asset by the exchanging user, and further by distributing a first part of the benefit to the first user and a second part of the benefit to one or both of the second user and the one or more stakeholders of the online gaming platform in accordance with the asset-specific distribution rights.

As used herein, any association (or relation, or reflection, or indication, or correspondency) involving servers, processors, client computing platforms, assets, exchanges, offers, transactions, reversals, in-game actions, rights, benefits, ownership, users, metrics, metric values, scores, periods, instructions, operations, determinations, distributions, transfers, presentations, notifications, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
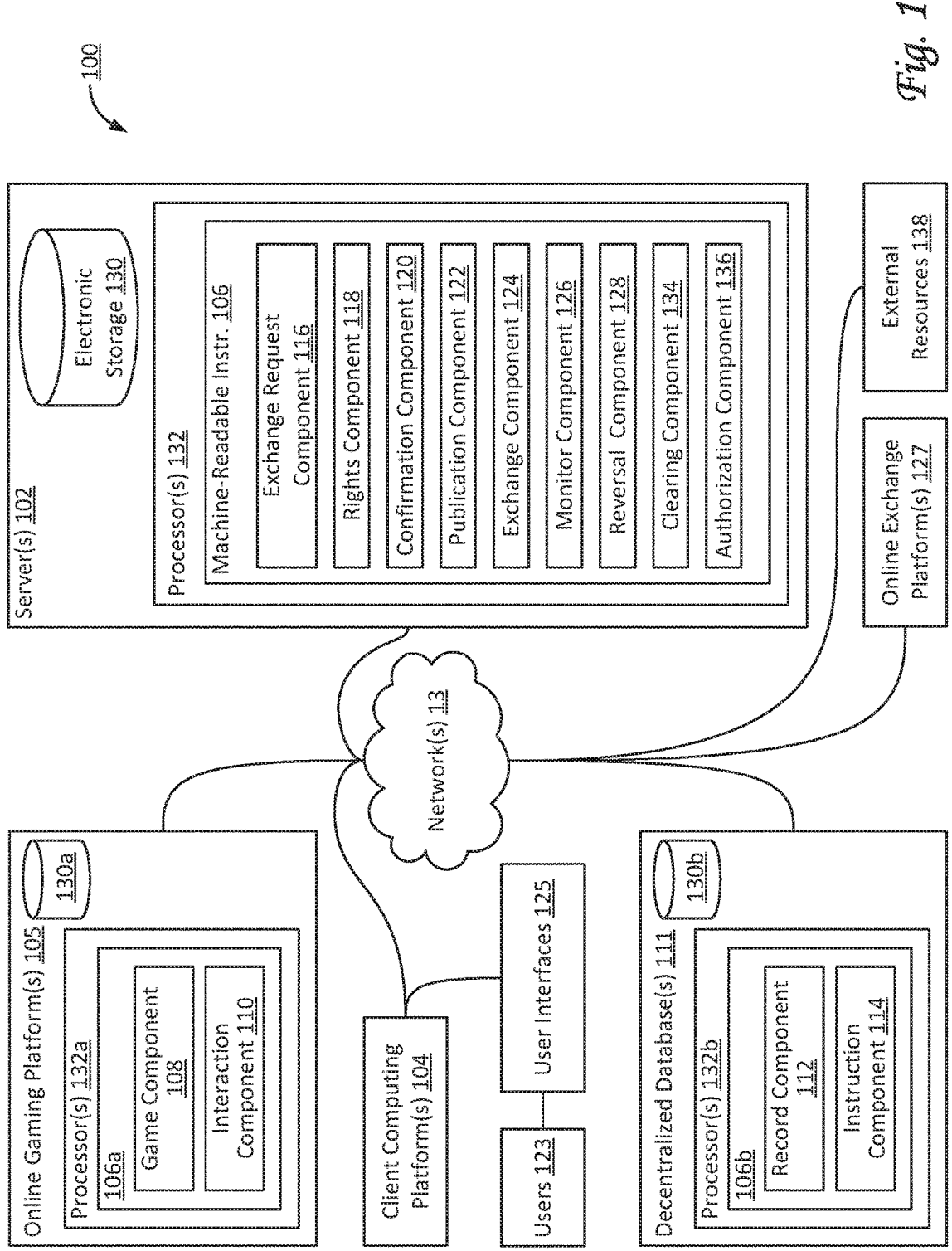
FIG. 1 illustrates a system configured for clearing and reversing reversible exchanges of digital assets, in accordance with one or more implementations.

FIG. 1 illustrates a system 100 configured for clearing and reversing reversible exchanges of digital assets, in accordance with one or more implementations. In some implementations, system 100 may be configured to control an automated electronic networked central clearinghouse 115 for clearing and reversing reversible exchanges of digital assets, including but not limited to digital assets that are not fungible. In some implementations, digital assets may be virtual items that are usable within one or more online gaming platforms 105. For example, some digital assets may represent a user-controllable three-dimensional in-game character that can interact with other virtual items within online gaming platform 115.

By way of non-limiting example, digital assets may represent virtual items. In some implementations, virtual items may include one or more of weapons, toys, characters, abilities, skills, tools, pets, clothing, vehicles, game levels, missions, assignments, chapters, tasks, mini-games, restricted areas within a virtual space, restricted modes of gameplay, access rights within an online game, and/or other virtual items. In some implementations, virtual items may refer to any item or object within gaming platform 105 that a user may use, own, sell, trade, destroy, and/or otherwise effectuate a change of ownership of.

As used herein, a digital asset is fungible if it is functionally and/or physically indistinguishable from another digital asset. For example, a payment token such as a Bitcoin may be a fungible digital asset. A digital asset may be non-fungible if it is unique, or one-of-a-kind. For example, a specific individual CryptoKitty™ may be a non-fungible digital asset. A digital asset may be semi-fungible if there is a set of a limited number of similar but distinguishable digital assets. For example, a limited-edition Blank™ or another in-game character may be a semi-fungible digital asset. For example, one of a limited number of 2-dimensional or 3-dimensional in-game virtual items may be a semi-fungible digital asset. For example, a digital ticket to a show, concert, exhibition, and/or other event may be a semi-fungible digital asset. For example, a piece of art or jewelry (e.g., as a virtual item or as representing a physical item) may be a semi-fungible digital asset. As used herein, both non-fungible and semi-fungible digital assets are considered as "not fungible" digital assets. In some implementations, semi-fungible digital assets may share the same or similar data as other digital assets, but have at least a unique identifier, and/or other distinguishable asset-specific information.

In some implementations, digital assets may be usable within one or more games. Instances of the games may be executed within one or more online gaming platforms 105. As used herein, online gaming platform 105 may refer to either an individual game (e.g., an interactive online game), a type of gaming console and its ecosystem, and/or both. Online gaming platform 105 may be operated, hosted, and/or owned by one or more stakeholders of online gaming platform 105. For example, a platform operator (and/or another stakeholder) may sell digital in-game assets (e.g., characters, weapons, resources, etc.) to users 123 of online gaming platform 105. However, such a sale is not a player-to-player exchange. As used herein, exchanges refer to player-to-player actions that facilitate individual players to auction, sell, purchase, trade, barter, and/or otherwise exchange digital assets. In other words, individual players may own individual virtual items, and exchange these items with other individual players by virtue of the systems and methods described in this disclosure. Due to an exchange, ownership of a digital asset transitions from an original owner to a new owner (even if there may, in some implementations, be one or more intermediary and/or temporary owners during the process of performing the exchange). As used herein, a particular exchange of a particular digital asset may be reversible if at least one party to the particular exchange may unilaterally opt to reverse and/or undo the particular exchange such that the particular digital asset is returned to the original owner. In some implementations, either the original owner of the particular digital asset or the new owner of the particular digital asset may unilaterally opt for a reversal of the particular exchange. In some implementations, only the new owner may unilaterally opt for a reversal of the particular exchange. In some implementations, reversibility of a particular exchange may be limited in one or more ways. For example, reversibility may be time-limited to a predetermined number of days from a predefined moment and/or action within the particular exchange. For example, in some implementations, the predetermined number of days may be one of 2, 3, 4, 5, 6, 7, 10, 14, 15, 21, 30, 45, 60, 90, 180, and/or another number of days. In some implementations, the predetermined number of days may be range between one of 2-6 days, 3-7 days, 5-10 days, 5-20 days, 3-30 days, 7-60 days, or any other range of days starting at a number of days between 1 and 180 days and ending at a greater number of days between 2 and 180 days. In some implementations, the predefined moment and/or action within the particular exchange may be the moment the new owner commits to the particular exchange (where commitment may be defined in absence of reversibility or assuming the particular exchange will not be reversed). In some implementations, the predefined moment and/or action within the particular exchange may be the moment the new owner can use the particular digital asset in any way. In some implementations, the predefined moment and/or action within the particular exchange may be the moment the original owner authorizes the particular exchange.

In some implementations, system 100 may include one or more of an automated electronic networked central clearinghouse 115, one or more online gaming platforms 105, one or more decentralized databases 111, one or more online exchange platforms 127, electronic storage 130, one or more servers 102, one or more client computing platforms 104, one or more user interfaces 125, one or more external resources 138, and/or other components. Users 123 (also referred to as players) may include one or more of a first user, a second user, a third user, a fourth user, and/or other users.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 123 may access system 100 via client computing platform(s) 104.

In some implementations, system 100 and/or server(s) 102 may be configured to communicate with one or more of online gaming platform(s) 105, decentralized database(s) 111, automated electronic networked central clearinghouse 115, users 123, and/or other components. Users 123 may include players who play and/or otherwise interact on online gaming platform 105. In some implementations, online gaming platform 105 may include an online store or exchange that facilitates exchanges of digital assets. In some implementations, users can exchange digital assets (such as, e.g., in-game virtual items) through one or more external exchange platforms 127, including but not limited to eBay™.

Automated electronic networked central clearinghouse 115 may include one or more of electronic storage 130, server(s) 102, processor(s) 132, machine-readable instructions 106, and/or other components. Server(s) 102 may be configured by machine-readable instructions 106. Machine-readable instructions 106 may include one or more instruction components. The instruction components may include computer program components. The instruction components may include one or more of a game component 108, an interaction component 110, a record component 112, an instruction component 114, an exchange request component 116, a rights component 118, a confirmation component 120, a publication component 122, an exchange component 124, a monitor component 126, a reversal component 128, a clearing component 134, an authorization component 136, and/or other instruction components. The depiction in FIG. 1 of certain components being arranged, organized, and/or otherwise included in other components is merely exemplary, and not intended to be limiting.

In some implementations, online gaming platforms 105 may include one or more of electronic storage 130a, server(s) 102 (not depicted in FIG. 1), processor(s) 132a, machine-readable instructions 106a, and/or other components. Electronic storage 130a may be similar to electronic storage 130 as described elsewhere in this disclosure, though included in online gaming platforms 105. Processor(s) 132a may be similar to processor(s) 132 as described elsewhere in this disclosure, though included in online gaming platforms 105. Machine-readable instructions 106a may be similar to machine-readable instructions 106 as described elsewhere in this disclosure, though included in online gaming platforms 105.

In some implementations, decentralized database(s) 111 may include one or more of electronic storage 130b, server(s) 102 (not depicted in FIG. 1), processor(s) 132b, machine-readable instructions 106b, and/or other components. Electronic storage 130b may be similar to electronic storage 130 as described elsewhere in this disclosure, though included in decentralized database(s) 111. Processor(s) 132b may be similar to processor(s) 132 as described elsewhere in this disclosure, though included in decentralized database(s) 111. Machine-readable instructions 106b may be similar to machine-readable instructions 106 as described elsewhere in this disclosure, though included in decentralized database(s) 111.

Game component 108 may be configured to execute an instance of a game (e.g., an online game within online gaming platform 105) to facilitate presentation of the online game to users 123. In some implementations, game component 108 may be configured to implement in-game actions in the instance of the game, e.g., in response to action requests for the in-game actions by users 123. In some implementations, game component 108 may be arranged, organized, and/or otherwise included in online gaming platform 105. As used herein, the term "game" may refer to one or more games within gaming platform 105. The game may be provided via a virtual space, and may include a plurality of resource types and/or maps. An instance of the virtual space may be executed by one or more computer components to determine views of the virtual space. In some implementations, the view may be communicated (e.g., by streaming, via object/position data, and/or other information) from server(s) 102 and/or other sources to client computing platforms 104 for presentation to users 123. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. In some implementations, one or more view parameters may be selectable by a user.

The instance of the game may include a simulated space that is accessible by users 123 by clients (e.g., client computing platforms 104) that present the views of the virtual space to a user. The simulated space may have a topography, express ongoing real-time interaction by one or more users 123, and/or include one or more objects positioned within the topography that are capable of locomotion and/or movement within the topography. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the game, users 123 may control characters, objects, simulated physical phenomena, and/or other elements within the virtual space to interact with the virtual space and/or each other. The user characters may include avatars. As used herein, the term "user character" may refer to an object or group of objects present in the virtual space, that correspond(s) to an individual user. A particular user character may be controlled by the particular user with which it is associated. Such user characters may be referred to as user-controlled characters. User-controlled element(s) may move through and interact with the virtual space (e.g., non-user characters in the virtual space, other objects in the virtual space, etc.). User-controlled elements controlled by and/or associated with a given user may be created and/or customized by the given user. Individual users 123 may have an "inventory" of virtual goods and currency (e.g., resources of the plurality of resource types) that the individual user can use (e.g., by manipulation of a user character and/or other user-controlled elements) and/or other items, to perform in-game actions within the virtual space. In some implementations, user inventories may be managed using decentralized database 111. For example, ownership of individual virtual items included in an individual user inventory may be recorded on decentralized database 111. In some implementations, individual user inventories may correspond to individual smart contracts stored on decentralized database 111.

Interaction component 110 may be configured to facilitate interaction between users 123 within online gaming platform 105, and, in particular, within instances of the online games that are executed by game component 108. For example, interaction component 110 may facilitate interaction by a particular user with other users within an instance of a particular online game. For example, the interaction may include user-controlled in-game actions by a particular digital asset that are controlled by the particular user. In some implementations, the interaction may occur subsequent to temporarily transferring ownership of the particular digital asset from an original owner (e.g., to the particular user). Alternatively, and/or simultaneously, the interaction may occur prior to a determination (e.g., by reversal component 128) whether to reverse a particular reversible exchange involving the particular digital asset. In some implementations, one or more particular types of interaction may be facilitated by interaction component 110. For example, interaction may be limited to certain types of in-game actions. In some implementations, interaction may be limited to a certain time or period, including but not limited to a waiting period as used and described elsewhere in this disclosure regarding time-limited reversibility of particular exchanges. In some implementations, interaction component 110 may be arranged, organized, and/or otherwise included in online gaming platform 105.

In some implementations, interaction component 110 may facilitate interaction by a particular user with other users within online gaming platform 105, through a particular digital asset that is being controlled by the particular user during a particular period, even though the particular user is not (yet) the non-temporary owner of the particular digital asset. For example, the particular period may start when the particular user commits to the exchange involving the particular digital asset, or when the particular user provides the benefit in exchange for the particular digital asset, and/or at another predefined moment during the exchange process. For example, the particular period may end at the moment a determination has been made regarding a reversal of the exchange involving the particular digital asset. In some implementations, one or more types of ownership rights are temporarily transferred to the particular user during the particular period. For example, one of the types of ownership rights may give the particular user the right to use the particular digital asset in certain limited ways. For example, usage may be limited to one or more types of in-game actions. For example, the allowed one or more types of in-game actions may exclude in-game actions that inflict damage to (or even destroy) the particular digital asset. In some implementations, upon a reversal of the exchange involving the particular digital asset, the temporarily transferred (types of) ownership rights may be modified and/or removed such that the particular user is no longer allowed and/or able to user the particular digital asset in the same way as compared to the particular period. In other words, the particular interaction as facilitated during the particular period may be disabled upon the reversal of the exchange.

Record component 112 may be configured to record rights pertaining to digital assets on decentralized database 111. In some implementations, record component 112 may record rights on a decentralized ledger implemented by decentralized databased 111. For example, the decentralized ledger may be a blockchain. The rights may include ownership rights, distribution rights, and/or other rights. For example, particular recorded rights may reflect ownership of a particular digital asset by a particular user. For example, the particular digital asset may be not fungible, and may represent a three-dimensional in-game user-controllable character that can interact with other virtual items within online gaming platform 105. Recorded rights may be asset-specific. For example, distribution rights for a particular digital asset may designate rights to certain distributions of benefits upon an exchange involving the particular digital asset. For example, the asset-specific distribution rights for a particular digital asset may include one or more of (i) a right owned by a different user to a part of the benefits upon an exchange, (ii) a right owned by one or more stakeholders of online gaming platform 105 to a part of the benefits upon an exchange, (iii) a right owned by one or more stakeholders of automated electronic networked central clearinghouse 115 upon an exchange, and/or other distribution rights. These parts of a benefit may have different sizes, percentages, and/or conditions.

In some implementations, record component 112 may be configured to record rights in decentralized database 111. In some implementations, record component 112 may add, modify, and/or remove recorded rights. For example, in accordance with received instructions, record component 112 may transfer ownership of a particular digital asset from a first owner to a second owner (e.g., from an original owner to a new owner). In some implementations, in accordance with received instructions, record component 112 may transfer ownership of a particular digital asset temporarily, e.g., from a first owner to a temporary second owner. In some case, a temporary owner may be a holding account that is merely used until ownership is transferred to either the original owner or a new owner. As used herein, the term "temporary" (and derivatives thereof) refers to a transfer or to ownership that is either known to be changed and/or modified within a predetermined period, or expected to be changed and/or modified within a predetermined period. Conversely, a non-temporary transfer from a first owner to a second owner (due to a particular exchange) can conceivably be changed and/or reverted (back from the second owner to the first owner) due to a separate and new exchange that is independent of the first particular exchange. In some implementations, in accordance with received instructions, record component 112 may transfer ownership of a particular digital asset non-temporarily from a first owner to a second owner, e.g., when a particular exchange is not reversible or no longer reversible. In some implementations, record component 112 may be arranged, organized, and/or otherwise included in decentralized database 111.

Instruction component 114 may be configured to receive (sets of) instructions to add, modify, and/or remove recorded rights in decentralized database 111. For example, instruction component 114 may receive one or more sets of instructions from automated electronic networked central clearinghouse 115. Instruction component 114 may provide received sets of instructions to record component 112 for execution. In some implementations, instruction component 114 may be arranged, organized, and/or otherwise included in decentralized database 111.

Exchange request component 116 may be configured to receive exchange requests from users. Exchange request may indicate a particular user offers a particular digital asset for exchange. In some implementations, an exchange request may indicate a particular user offers a particular digital asset for a reversible exchange, e.g., on a fiat-currency-based online exchange platform (e.g., online exchange platform 127).

Rights component 118 may be configured to obtain asset-specific rights (e.g., ownership rights, distribution rights, and/or other rights) for particular digital assets. In some implementations, rights component 118 may be configured to access decentralized database 111 to obtain the asset-specific rights (that are recorded on decentralized database 111, e.g., in one or more smart contracts). In some implementations, rights component 118 may be configured to obtain different sets of rights (at different moments) for the same particular digital asset. For example, rights component 118 may obtain a first set of rights at a first moment during a particular exchange, a second set of rights at a second moment (different from the first moment) during the same particular exchange, and so forth. For example, the rights to a given digital asset as recorded on decentralized database 111 may include a first and second distribution right as follows: a 5% distribution right for a user (e.g., the user who designed the particular three-dimensional in-game user-controllable character that is represented by the given digital asset), and a 1% distribution right for a stakeholder of online gaming platform 105, and these distribution rights may be exercised upon an exchange of the given digital asset that is not reversed.

Confirmation component 120 may be configured to determine expected benefits for exchanges of digital assets. For example, confirmation component 120 may determine a particular expected benefit for a particular exchange of a particular digital asset. In some implementations, expected benefits may be the benefits expected by an original owner of a particular digital asset, upon exchange od the particular digital asset. Determinations by confirmation component 120 may be based on asset-specific rights obtained by rights component 118. In some implementations, confirmation component 120 may be configured to transfer notifications regarding expected benefits to users 123. For example, confirmation component 120 may transfer a particular notification to the original owner of a particular digital asset prior and/or during a particular exchange. The particular notification may pertain to and/or provide information regarding determined expected benefits for the particular exchange of the particular digital asset. For example, for the given digital asset described in the preceding paragraph, with a first and second distribution right: the given digital asset may be exchanged, between the original owner and a new owner, for $100, but due to the distribution rights of 5% and 1% as previously described, the determined expected benefits to the original owner would be $94. Confirmation component 120 may notify the original owner of the determined expected benefit (by transferring a notification). In some implementations, the original owner may subsequently authorize the publication of the offer for the particular exchange and/or the particular exchange itself.

Publication component 122 may be configured to generate publication information of digital assets. Publication component 122 may be configured to generate publication information of digital assets for publication on a fiat-currency-based online exchange platform (e.g., online exchange platform 127). In some implementations, publication may offer digital assets for (reversible) exchange on the fiat-currency-based online exchange platform.

Exchange component 124 may be configured to receive exchange information regarding offered exchanges. Exchange information may be asset-specific and/or exchange-specific. In some implementations, exchange component 124 may receive exchange information from a fiat-currency-based online exchange platform (e.g., online exchange platform 127). For example, the received exchange information may be regarding a particular reversible exchange of a particular digital asset for a particular benefit. For example, a user may have accepted an offer for exchanging the particular digital asset for $100. In some implementations, exchange component 124 may be configured to receive benefits that correspond to particular exchanges. For example, the received exchange information may include the particular benefit. In some implementations, the received exchange information may be related to received benefit. For example, a particular received benefit may correspond to a particular exchange.

Monitor component 126 may be configured to monitor events and/or information that are pertinent to reversibility of reversible exchanges. For example, monitor component 126 may monitor whether a particular user requests a reversal of a particular reversible exchange. In some implementations, monitor component 126 may monitor whether a particular user disclaims a right to request the reversal of a particular reversible exchange. In some implementations, monitor component 126 may monitor whether a particular user constructively disclaims the right to request the reversal of a particular reversible exchange through one or more in-game actions within online gaming platform 105, including but not limited to in-game actions that damage and/or diminish the first non-fungible digital asset, or that potentially damage and/or diminish the first non-fungible digital asset. In some implementations, for a particular reversible exchange, one or more types of monitoring by monitor component 126 may occur during a particular waiting period. For example, monitor component 126 may monitor, during a particular waiting period, whether a particular user requests a reversal of a particular reversible exchange. In some cases, reversibility of reversible exchanges may be time-limited (e.g., to predetermined number of days). In some implementations, the particular waiting period may correspond to a period of reversibility. In some implementations, the particular waiting period may expire or time-out after a predetermined number of days passes from receipt of the benefit. For example, the predetermined number of days may be between 7 and 60 days. For example, the predetermined number of days may be another number of range of days, as described elsewhere in this disclosure in relation to time-limited reversibility. In some implementations, the particular waiting period may immediately expire upon a request by a particular user for the reversal of a particular reversible exchange. In some implementations, the particular waiting period may immediately expire upon a particular user disclaiming the right to request the reversal of a particular reversible exchange. In other words, once such a right has been disclaimed, the particular exchange may no longer be reversible, even if the particular user subsequently requests a reversal. In some implementations, the particular waiting period may expire upon a particular user effectuating one or more in-game actions within online gaming platform 105 that (potentially and/or actually) damage and/or diminish the particular digital asset being exchanged. In some implementations, different reasons and/or causes for a particular waiting period expiring may be grouped together, such that the particular waiting period expires if any of a number of different conditions and/or occurrences is true. For example, some conditions may be initiated by (or originate from) online gaming platform 105 (such as the occurrence of certain types of in-game actions), whereas other conditions may be initiated by (or originate from) actions taken by particular users through online exchange platform 127 (such as request a reversal of a reversible exchange). In some implementations, expirations of waiting periods may trigger and/or otherwise cause determinations by reversal component 128. In other words, as soon as a particular waiting period expires, reversal component 128 may make a determination (e.g., regarding reversibility).

Reversal component 128 may be configured to determine whether reversible exchanges are reversed. In some implementations, determinations by reversal component 128 may be based on information from monitor component 126. In some implementations, determinations by reversal component 128 may be based on information (also referred to as reversibility information) received from one or more users, including but not limited to the particular user who previously accepted the offer for exchanging the particular digital asset. For example, subsequent to accepting the offer for exchanging the particular digital asset, the particular user may opt to reverse the particular exchange. Reversibility information may reflect that decision, and may be provided to reversal component 128. Determinations by reversal component 128 may be based on a combination of the reversibility information from one or more users 123 and other pertinent information, such as, by way of non-limiting example, timing information regarding the particular exchange. For example, if a particular exchange is only reversible within a particular predetermined number of days (i.e., the reversibility is time-limited), a determination by reversal component 128 will take into consideration whether the predetermined number of days have passed. In some implementations, reversibility information may be provided by other components of system 100, including but not limited to online gaming platform 105. For example, online gaming platform 105 may provide information that an exchange is no longer reversible due to the particular digital asset being destroyed and/or damaged by the new owner.

Clearing component 134 may be configured to clear reversible exchanges. In some implementations, clearing component 134 may clear reversible exchanges responsive to determinations by reversal component 128. For example, clearing component may clear a particular (reversible) exchange responsive to a determination, by reversal component 128, indicating no reversal of the particular exchange. In some implementations, clearing exchanges may include transferring ownership of digital assets, distributing benefits in accordance with distribution rights of the digital assets, distributing benefits in accordance with the expected benefits, and/or other actions and/or distributions. In some implementations, clearing of a particular exchange may imply that the particular exchange is no longer reversible. In some implementations, a particular transfer of ownership may be implemented by providing instructions for record component 112 to instruction component 114. In some implementations, responsive to a determination that a particular exchange will be reversed, clearing component 134 will not clear the particular exchange. Instead, system 100 will transfer ownership back to the original owner, and transfer all or most of the received benefit back to the user who provided the benefit.

Authorization component 136 may be configured to receive information and/or authorization from users 123. In some implementations, authorization component 136 may receive authorization from an original owner for the publication of publication information (e.g., publication information generated by publication component 122). In some implementations, the received authorization may pertain to one or more other steps and/or moments during the process of a reversible exchange. In some implementations, authorization component 136 may receive authorization from the original owner subsequent to the original owner receiving a notification regarding expected benefits.

Figure 3:
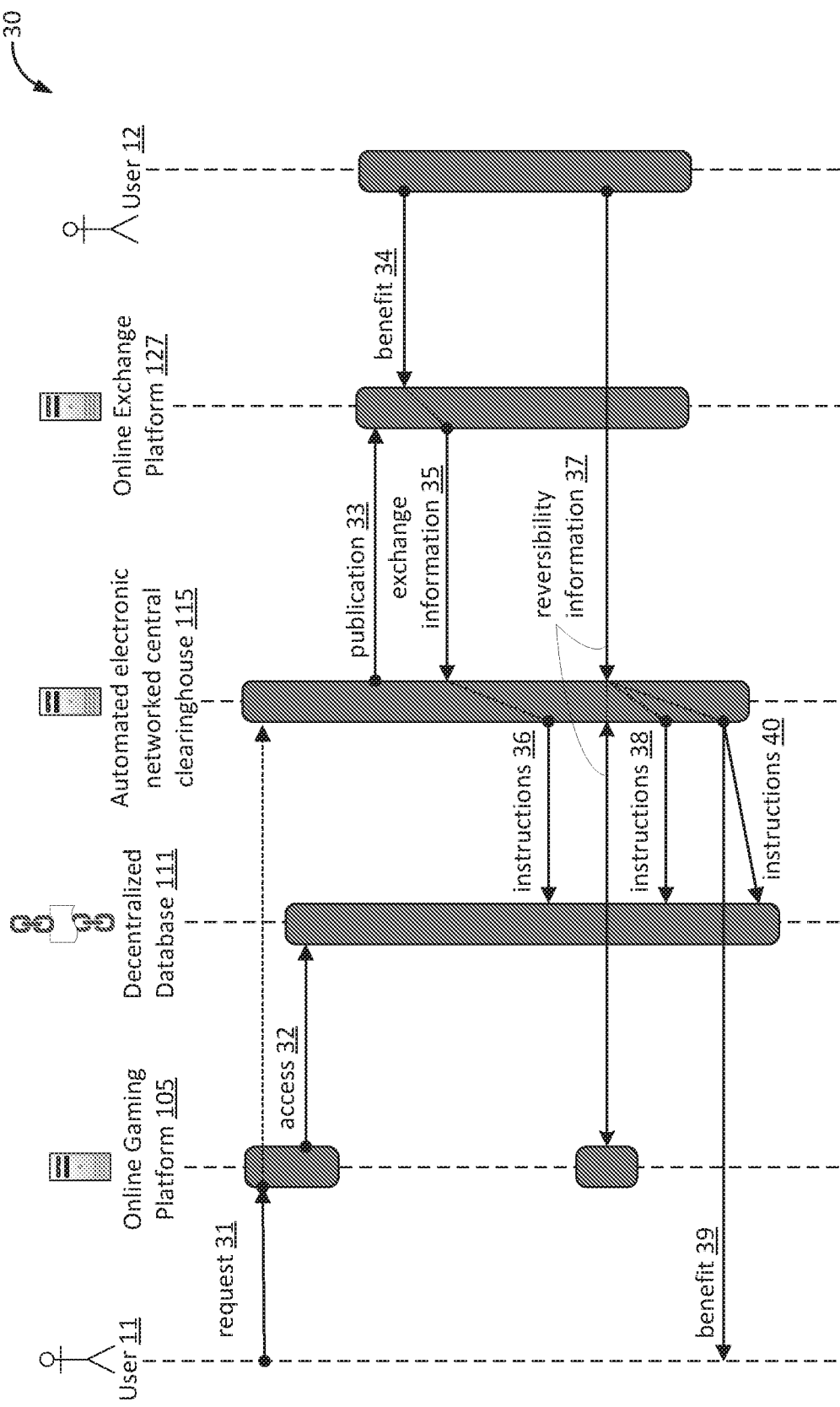
FIG. 3 illustrates an exemplary timing diagram of actions as may occur in a system as described, in accordance with one or more implementations.

By way of non-limiting example, FIG. 3 illustrates an exemplary timing diagram 30 of actions as may occur in a system similar to or the same as system 100. A first action in timing diagram 30 represents a request 31 from a user 11 to one or more of online gaming platform 105 and/or automated electronic networked central clearinghouse 115. Subsequent to request 31, an access 32 represents access to decentralized database 111 (e.g., on a permissioned blockchain that is configured to record ownership and distribution rights of digital assets). In some implementations, access may be initiated by gaming platform 105. In some implementations, access may be initiated by automated electronic networked central clearinghouse 115 (the latter type of access is not depicted in FIG. 3). Subsequent to access 32, a publication 33 occurs, representing the generation of publication information and the publication thereof on online exchange platform 127. Subsequently, user 12 provides a benefit 34 to online exchange platform 127, which subsequently provides corresponding exchange information 35 (and possibly the benefit as well) to automated electronic networked central clearinghouse 115. Automated electronic networked central clearinghouse 115 provides a set of instructions 36 to decentralized database 111, to temporarily transfer at least some rights (e.g., usage rights for limited in-game actions within online gaming platform 105) to user 12. User 12 provides reversibility information 37 to either online gaming platform 105, automated electronic networked central clearinghouse 115, and/or both. For example, one type of reversibility information may be a confirmation by user 12 that the exchange is no longer reversible. For example, one type of reversibility information may be a request by user 12 to reverse the exchange. For example, one type of reversibility information may be implied by in-game actions initiated by user 12. Subsequent to a determination whether to reverse a particular reversible exchange, either automated electronic networked central clearinghouse 115 provides a set of instructions 38 to decentralized database 111, to transfer ownership rights back to user 11, or automated electronic networked central clearinghouse 115 clears the reversible exchange. Clearing the reversible exchange may include distributing benefit 39 to user 11 (and other benefits to other components of the system, in accordance with the distribution rights), and providing a set of instructions 40 to decentralized database 111, to transfer ownership rights to user 12 non-temporarily. Actions in accordance with this disclosure may include additional and/or different actions and/or steps then depicted in FIG. 3, which is merely intended to be exemplary.

Figure 4:
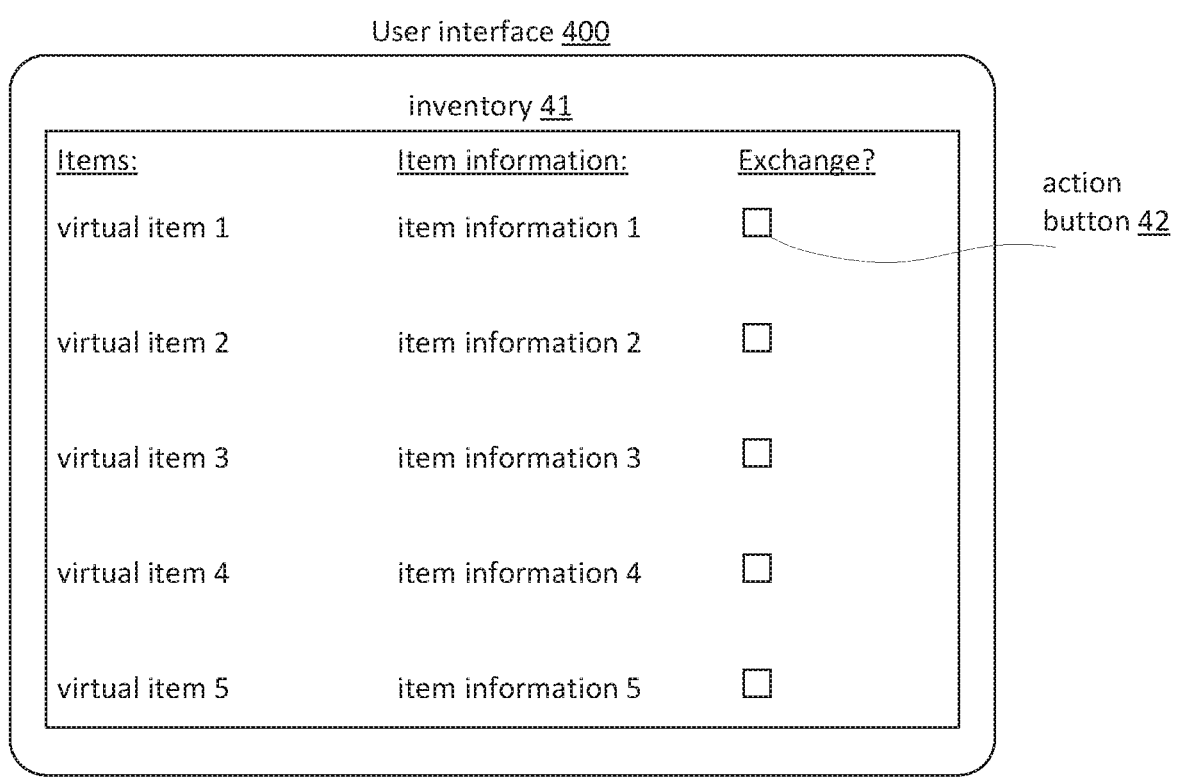
FIG. 4 illustrates a user interface, as may be presented to the users of a system as described, in accordance with one or more implementations.

By way of non-limiting example, FIG. 4 depicts a user interface 400, as may be presented to individual users through particular user interfaces 125 to facilitate the exchange of digital assets between users. Available digital assets for exchange may be presented as an inventory 41, including a list of virtual items (from 1 to 5), associated item information (from 1 to 5), and graphical user interface elements (here, action buttons) that enable an individual user to initiate an exchange, such as, for example an action button 42 that would, upon activation by the individual user, initiate an exchange involving virtual item 1. In some implementations, the associated virtual item information (here, item information 1 to 5) may include item-specific information. For example, store interface 400 may be presented to user 11 (in FIG. 3), such that activation of action button 42 causes an exchange request similar to request 31 (FIG. 3) to be provided to, e.g., automated electronic networked central clearinghouse 115. For example, store interface 400 may be presented to user 12 (in FIG. 3), such that activation of action button 42 causes a benefit similar to benefit 34 (FIG. 3) to be provided to, e.g., online exchange platform 127.

In some implementations, decentralized database 111 may be maintained by a distributed computing platform (not shown in FIG. 1). In some implementations, the distributed computing platform may be implemented by a set of client computing platforms and/or servers. The distributed computing platform may support a virtual machine (not shown in FIG. 1). The distributed computing platform and/or the virtual machine may form a runtime environment for smart contracts and/or other executable code. In some implementations, the distributed computing platform may include electronic storage configured to store part or all of decentralized database 111. The smart contracts may be stored on decentralized database 111. In some implementations, the distributed computing platform may be the EOSIO platform. In some implementations, the distributed computing platform may be Ethereum. In some implementations, the distributed computing platform may be similar to Ethereum. In some implementations, the virtual machine may be a decentralized virtual machine.

Decentralized database 111 may implement a decentralized ledge that records rights pertaining to digital assets. For example, a blockchain is a type of ledger, as well as a type of decentralized database that records rights pertaining to digital assets. A given (digital) asset may be owned by a particular user. An asset may include anything of material value or usefulness that is owned by or on behalf of one or more users. In some implementations, a virtual item (that may be used within gaming platform 105 and/or may be useful within gaming platform 105) may be represented by a digital asset that is recorded on one or more decentralized database 111. In some implementations, a right pertaining to an object (e.g., a distribution right) may be an asset, the object being a physical or a virtual item. Multiple rights may form a set of rights or a bundle of rights that may be transferred and/or otherwise acted on and/or operated on together. For example, rights may include one or more of a right to use, a right to sell, a right to destroy, a right to certain types of distributions, and/or other rights. For example, in some implementations, rights pertaining to a virtual item (e.g., ownership) may be recorded on decentralized database 111.

In some implementations, tokens may be a type of asset. In some implementations, tokens may include one or more of security tokens, utility tokens, payment tokens, initial coin offering (ICO) tokens, virtual currency tokens, crypto tokens, ERC-20 tokens, EOS tokens, and/or other tokens. In some implementations, tokens not only represent value, but may have a specific use in a particular distributed computing platform, e.g., in the operation of decentralized database 111.

In some implementations, decentralized database 111 may register transactions that modify ownership (and/or other rights) pertaining to digital assets. A smart contract may implement a (type of) digital asset. In some implementations, once a smart contract has been added to a blockchain, the smart contract may be referred to as published, posted, registered, and/or recorded. Elements of decentralized database 111 may be grouped together in units that are referred to as blocks. For example, an individual block may include one or more assets and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more assets, one or more transactions, and/or other information.

In some implementations, decentralized database 111 may be publicly accessible and append-only. In some implementations, existing blocks of a distributed blockchain can substantially not be altered or deleted, unless multiple copies of the distributed blockchain are altered. This is unlikely to happen provided that multiple copies of the distributed blockchain are stored on different computing platforms, e.g., in different geographical locations. The distributed blockchain may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or assets may be digitally signed in a manner that proves integrity and/or prevents tampering, e.g., by providing authentication.

Figure 5A:
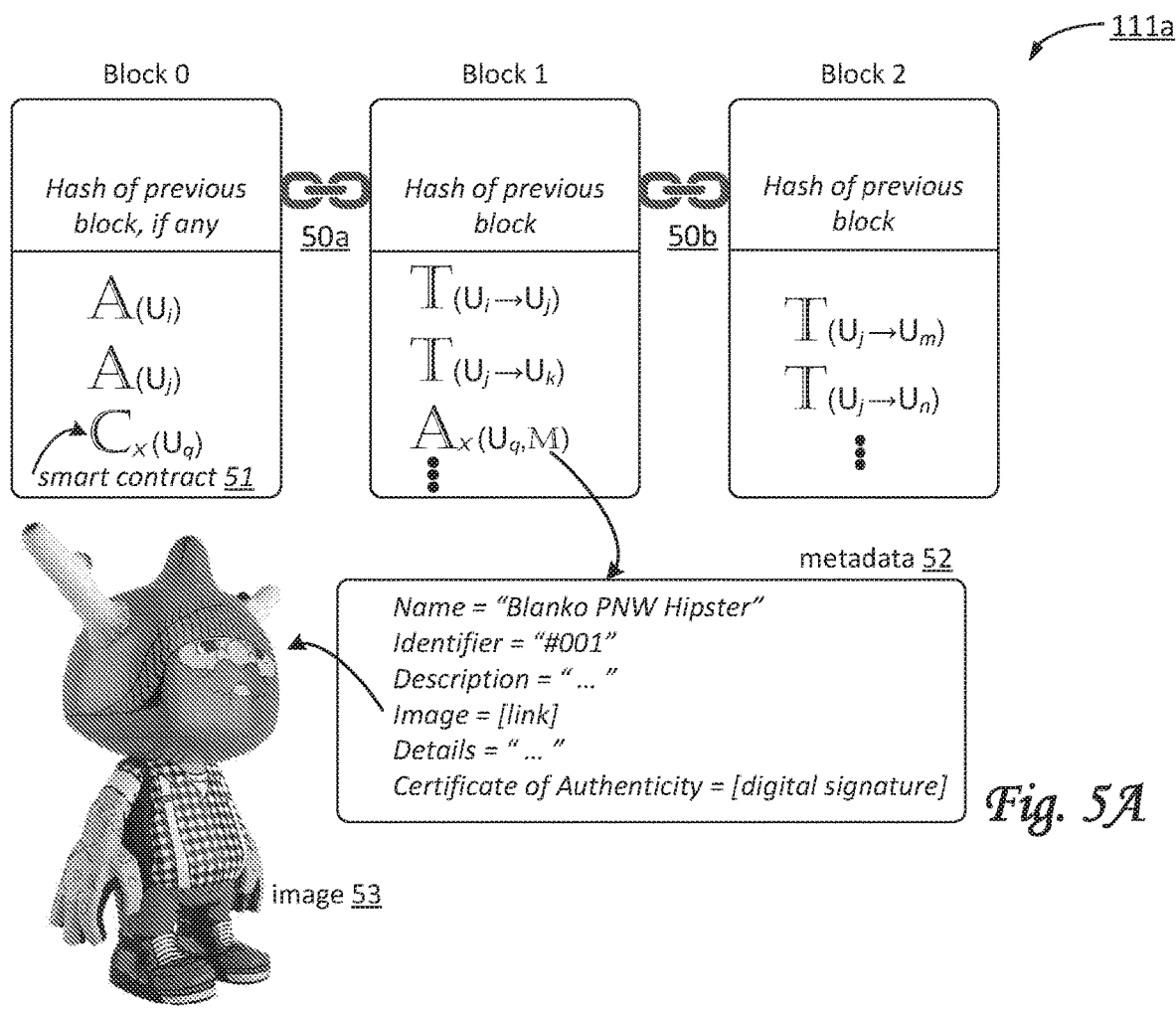
FIGS. 5A-5B illustrate exemplary blockchains as may be used by a system configured for clearing and reversing reversible exchanges of digital assets, in accordance with one or more implementations.

By way of non-limiting example, FIG. 5A illustrates a blockchain 111a that implements a blockchain including a block 0, a block 1, and a block 2. As time progresses, more blocks may be added to blockchain 111a. The blocks within blockchain 111a are ordered. As shown in block 0, three assets (indicated by a capital "A" or "C") are created and/or generated, and subsequently assigned to three users or players: a first asset is assigned to user i (Ui), a second asset is assigned to user j (Uj), and a third asset is a smart contract 41 (indicated by a capital "C") that is assigned to or owned by user q (Uq). Smart contract 41 may implement a limited number of digital assets of a given type "X". A function call to a function defined by smart contract 41 (e.g., to request a particular type of usage, creation, and/or issuance of a digital asset of type "X") may be depicted and/or implemented as a transaction (e.g., the function may be invoked in exchange for consideration). In some implementations, smart contract 41 may have been posted to blockchain 111a by (or on behalf of) an owner or creator (here, user q). As used in the context of blockchains, assignments may record ownership. These assets and smart contracts may be individually manifested, deployed, and/or instantiated through a record component similar to record component 112 (see FIG. 1). Block 1 is connected to block 0 (as indicated by a link 50a), for example by including an address of block 1 in block 0, or vice versa. Likewise, block 1 is connected to block 2, as indicated by a link 50b.

In block 1, one asset (labeled Ax) is assigned to user q (Uq), for example by associating an address of user q with asset Ax. Asset Ax may represent an individual digital asset of type "X". Asset Ax may be created and/or issued by invoking one or more function calls to smart contract 41. Asset Ax may have associated metadata 52 (indicated by a capital "M"), which may include and/or link to different types of information, including but not limited to one or more of a name, identifier, description, an image 53, (in-game) details, certificate of authenticity, and/or other information, as depicted. For example, the certificate of authenticity may be a digital signature. Additionally, block 1 includes two transactions (indicated by a capital "T"): a first transaction from user i to user j, and a second transaction from user j to user k. Block 2 includes a first transaction from user j to user m, and a second transaction from user j to user n. In some implementations, based on the contents of the blocks, any user of blockchain 111a may determine the current assets of blockchain 111a, and the balances of any user. In some implementations, the balance of a particular user may be verified prior to adding a transaction that reduces that particular user's balance. For example, an individual user may not be allowed to transfer assets the individual user does not own.

Figure 5B:
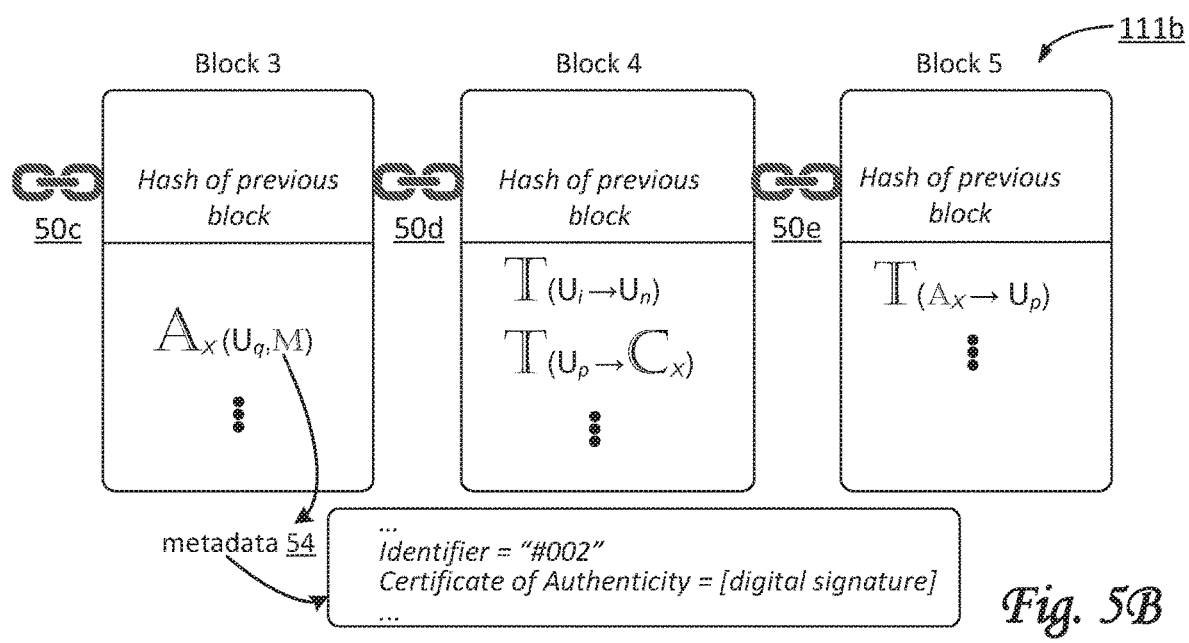

By way of non-limiting example, FIG. 5B illustrates a blockchain 111b that includes the same blocks as blockchain 111a of FIG. 5A, plus additional blocks (block 3, block 4, block 5) that have been appended to the blockchain. Block 3 may be connected to block 2 (as indicated by a link 50c), block 4 may be connected to block 3 (as indicated by a link 50d), and block 5 may be connected to block 4 (as indicated by a link 50e). In block 3, another asset (labeled Ax, having associated metadata 44) of type "X" is assigned to user q (Uq). At least the identifier (here, "#002") and the certificate of authenticity in metadata 44 will be different than the identifier and the certificate of authenticity in metadata 42 of FIG. 5A. Block 4 includes two transactions (indicated by a capital "T"): a first transaction from user i to user n. For example, the transaction may represent a purchase of a first virtual item by user n. Additionally, block 4 includes a second transaction from user q to the same smart contract as depicted in block 0. For example, the second transaction may represent user q offering to exchange a particular digital asset of the given type "X" for a particular benefit. A user who provides the particular benefit would receive limited and temporary ownership rights to the particular digital asset regarding in-game actions involving the particular digital asset (at least until a determination regarding reversibility has been made). Block 5 includes a transaction (indicated by a capital "T"), representing a non-temporary transfer of ownership of the particular digital asset of the given type "X" from old owner user q to new owner user p. For example, the transaction in block 5 may occur after user p provides reversibility information regarding the exchange of the particular digital asset, the reversibility information indicating there will be no reversal of the exchange.

Referring to FIG. 1, user interfaces 125 may be configured to facilitate interaction between users 123 and system 100 and/or between users 123 and client computing platforms 104. For example, user interfaces 125 may provide an interface through which users 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100. In some implementations, user interface 125 may be a type of interface that facilitates the exchange of virtual items between users.

Referring to FIG. 1, in some implementations, server(s) 102, client computing platform(s) 104, and/or external resources 128 may be operatively linked via one or more electronic communication links. For example, such electronic communication links may be established, at least in part, via one or more networks 13, including but not limited to the Internet and/or other networks. It will be appreciated that this is not intended to be limiting, and that the scope of this disclosure includes implementations in which server(s) 102, client computing platform(s) 104, and/or external resources 128 may be operatively linked via some other communication media.

A given client computing platform 104 may include one or more processors configured to execute computer program components. The computer program components may be configured to enable an expert or user associated with the given client computing platform 104 to interface with system 100 and/or external resources 128, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a smart watch, a gaming console, and/or other computing platforms.

External resources 138 may include sources of information outside of system 100, external entities participating with system 100, and/or other resources. For example, in some implementations, external resources 138 may include an online financial platform through which users may access financial information and/or perform financial transactions. In some implementations, some or all of the functionality attributed herein to external resources 138 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, 124, 126, 128, 134, and/or 136, and/or other components. Processor(s) 132 may be configured to execute components 108, 110, 112, 114, 116, 118, 120, 122, 124, 126, 128, 134, and/or 136, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, 126, 128, 134, and/or 136 are illustrated in FIG. 1 as being implemented within particular components, in implementations in which processor(s) 132 includes multiple processing units, one or more of components 108, 110, 112, 114, 116, 118, 120, 122, 124, 126, 128, 134, and/or 136 may be implemented remotely from the other components. The description of the functionality provided by the different components 108, 110, 112, 114, 116, 118, 120, 122, 124, 126, 128, 134, and/or 136 described below is for illustrative purposes, and is not intended to be limiting, as any of components 108, 110, 112, 114, 116, 118, 120, 122, 124, 126, 128, 134, and/or 136 may provide more or less functionality than is described. For example, one or more of components 108, 110, 112, 114, 116, 118, 120, 122, 124, 126, 128, 134, and/or 136 may be eliminated, and some or all of its functionality may be provided by other ones of components 108, 110, 112, 114, 116, 118, 120, 122, 124, 126, 128, 134, and/or 136. As another example, processor(s) 132 may be configured to execute one or more additional components that may perform some or all of the functionality attributed below to one of components 108, 110, 112, 114, 116, 118, 120, 122, 124, 126, 128, 134, and/or 136.

Figure 2:
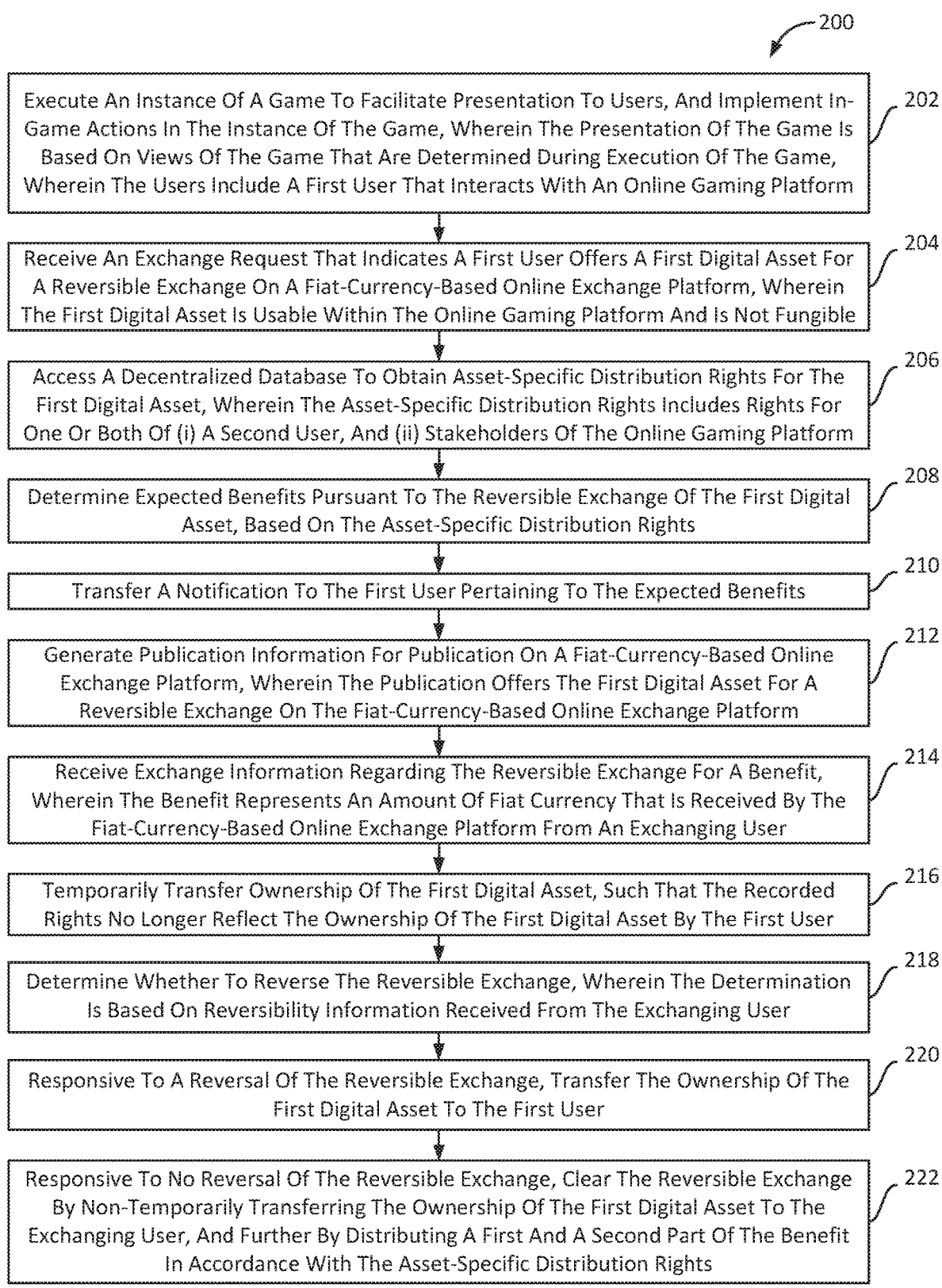
FIG. 2 illustrates a method for clearing and reversing reversible exchanges of digital assets, in accordance with one or more implementations.

FIG. 2 illustrates a method 200 for controlling an automated electronic networked central clearinghouse for clearing and reversing reversible exchanges of digital assets, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of a game is executed within an online gaming platform to facilitate presentation of the game to users, and in-game actions are implemented in the instance of the game in response to action requests for the in-game actions by the users. The presentation of the game is based on views of the game that are determined during execution of the game. The users include a first user that interacts with the online gaming platform. In some embodiments, operation 202 is performed by a game component the same as or similar to game component 108 (shown in FIG. 1 and described herein).

At an operation 204, an exchange request is received from the first user, that indicates the first user offers a first digital asset for a reversible exchange on a fiat-currency-based online exchange platform. The first digital asset is usable within the online gaming platform and is not fungible. In some embodiments, operation 204 is performed by an exchange request component the same as or similar to exchange request component 116 (shown in FIG. 1 and described herein).

At an operation 206, a decentralized database is accessed to obtain asset-specific distribution rights for the first digital asset. The decentralized database implements a decentralized ledger that records rights pertaining to digital assets. The recorded rights reflect ownership of the first digital asset by the first user. The asset-specific distribution rights includes rights for one or both of (i) a second user, and (ii) one or more stakeholders of the online gaming platform. In some embodiments, operation 206 is performed by a rights component the same as or similar to rights component 118 (shown in FIG. 1 and described herein).

At an operation 208, expected benefits are determined pursuant to the reversible exchange of the first digital asset, based on the asset-specific distribution rights for the first digital asset. In some embodiments, operation 208 is performed by a confirmation component the same as or similar to confirmation component 120 (shown in FIG. 1 and described herein).

At an operation 210, a notification is transferred to the first user pertaining to the expected benefits. In some embodiments, operation 210 is performed by a confirmation component the same as or similar to confirmation component 120 (shown in FIG. 1 and described herein).

At an operation 212, publication information is generated of the first digital asset for publication on the fiat-currency-based online exchange platform. The publication offers the first digital asset for the reversible exchange on the fiat-currency-based online exchange platform. In some embodiments, operation 212 is performed by a publication component the same as or similar to publication component 122 (shown in FIG. 1 and described herein).

At an operation 214, exchange information is received, from the fiat-currency-based online exchange platform, regarding the reversible exchange of the first digital asset for a benefit. The benefit represents an amount of fiat currency that is received by the fiat-currency-based online exchange platform from an exchanging user. In some embodiments, operation 214 is performed by an exchange component the same as or similar to exchange component 124 (shown in FIG. 1 and described herein).

At an operation 216, the ownership of the first digital asset is transferred, such that the recorded rights on the decentralized ledger no longer reflect the ownership of the first digital asset by the first user. In some embodiments, operation 216 is performed by a record component the same as or similar to record component 112 (shown in FIG. 1 and described herein).

At an operation 218, a determination is made whether to reverse the reversible exchange. The determination is based on reversibility information received from the exchanging user. In some embodiments, operation 218 is performed by a reversal component the same as or similar to reversal component 128 (shown in FIG. 1 and described herein).

At an operation 220, responsive to the determination indicating a reversal of the reversible exchange, the ownership of the first digital asset is transferred to the first user, such that the recorded rights on the decentralized ledger reflect the ownership of the first digital asset by the first user. In some embodiments, operation 220 is performed by a record component the same as or similar to record component 112 (shown in FIG. 1 and described herein).

At an operation 222, responsive to the determination indicating no reversal of the reversible exchange, the reversible exchange is cleared by non-temporarily transferring the ownership of the first digital asset to the exchanging user, such that the recorded rights on the decentralized ledger reflect the ownership of the first digital asset by the exchanging user, and further by distributing a first part of the benefit to the first user and a second part of the benefit to one or both of the second user and the one or more stakeholders of the online gaming platform in accordance with the asset-specific distribution rights. In some embodiments, operation 222 is performed by a clearing component the same as or similar to clearing component 134 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for controlling an automated electronic networked central clearinghouse for clearing and reversing reversible exchanges of digital assets, the method comprising:

executing, within an online gaming platform, an instance of a game to facilitate presentation of the game to users, and implementing in-game actions in the instance of the game in response to action requests for the in-game actions by the users, wherein the presentation of the game is based on views of the game that are determined during execution of the game, wherein the users include a first user;

receiving, from the first user, an exchange request that indicates the first user offers a first digital asset for a reversible exchange on a fiat-currency-based online exchange platform, wherein the first digital asset is usable within the online gaming platform, and wherein the first digital asset can interact with other virtual items within the online gaming platform;

accessing a decentralized database to obtain asset-specific distribution rights for the first digital asset, wherein the asset-specific distribution rights includes rights for one or both of:
 (i) a second user, and
 (ii) one or more stakeholders of the online gaming platform;

generating publication information of the first digital asset for publication on the fiat-currency-based online exchange platform, wherein the publication offers the first digital asset for the reversible exchange on the fiat-currency-based online exchange platform;

receiving, from the fiat-currency-based online exchange platform, exchange information regarding the reversible exchange of the first digital asset for a benefit, wherein the benefit represents an amount of fiat currency that is received by the fiat-currency-based online exchange platform from an exchanging user;

temporarily transferring the ownership of the first digital asset, such that recorded rights on the decentralized database no longer reflect the ownership of the first digital asset by the first user;

receiving reversibility information regarding one or more actions by the exchanging user;

making a determination whether to reverse the reversible exchange, wherein the determination is based on the received reversibility information;

responsive to the determination indicating a reversal of the reversible exchange, transferring the ownership of the first digital asset to the first user, such that the recorded rights on the decentralized database reflect the ownership of the first digital asset by the first user; and responsive to the determination indicating no reversal of the reversible exchange, clearing the reversible exchange by:
 (i) non-temporarily transferring the ownership of the first digital asset to the exchanging user, such that the recorded rights on the decentralized database reflect the ownership of the first digital asset by the exchanging user, and further by:
 (ii) distributing a first part of the benefit to the first user and a second part of the benefit to one or both of the second user and the one or more stakeholders of the online gaming platform in accordance with the asset-specific distribution rights, wherein the first part of the benefit is greater than the second part of the benefit.

2. The method of claim 1, further comprising:
facilitating interaction by the exchanging user with other users within the instance of the game, wherein the interaction includes user-controlled in-game actions by the first digital asset that are controlled by the exchanging user, wherein the interaction occurs subsequent to temporarily transferring the ownership of the first digital asset from the first user, and prior to the determination whether to reverse the reversible exchange.

3. The method of claim 2, wherein the interaction of the first digital asset within the instance of the game is limited to one or more types of in-game actions that exclude in-game actions that inflict damage to the first digital asset.

4. The method of claim 3, wherein the interaction of the first digital asset within the instance of the game is no longer limited to the one or more types of in-game actions that exclude in-game actions that inflict damage to the first digital asset, responsive to the determination indicating no reversal of the reversible exchange.

5. The method of claim 2, further comprising:
disabling the interaction by the exchanging user, responsive to the determination indicating the reversal of the reversible exchange.

6. The method of claim 1, further comprising:
receiving, from the first user, authorization for the publication of the publication information on the fiat-currency-based online exchange platform.

7. The method of claim 1, wherein the decentralized database implements a blockchain.

8. The method of claim 1, further comprising:
receiving, from the fiat-currency-based online exchange platform, the benefit, by the automated electronic networked central clearinghouse.

9. The method of claim 1, wherein the first digital asset is not fungible and is usable within the online gaming platform.

10. The method of claim 1, wherein the first digital asset represents a three-dimensional in-game user-controllable character that can interact with other virtual items within the online gaming platform.

11. A system configured for clearing and reversing reversible exchanges of digital assets, comprising:
an online gaming platform configured to host one or more games, comprising one or more processors configured by machine-readable instructions to:
 execute, within an online gaming platform, an instance of a game to facilitate presentation of the game to users, and implement in-game actions in the instance of the game in response to action requests for the in-game actions by the users, wherein the presentation of the game is based on views of the game that are determined during execution of the game, wherein the users include a first user; and
an automated electronic networked central clearinghouse for clearing and reversing reversible exchanges of digital assets, comprising one or more processors configured by machine-readable instructions to:
 receive, from the first user, an exchange request that indicates the first user offers a first digital asset for a reversible exchange on a fiat-currency-based online exchange platform, wherein the first digital asset is usable within the online gaming platform;
 access a decentralized database to obtain asset-specific distribution rights for the first digital asset, wherein the asset-specific distribution rights include rights for one or both of:
  (i) a second user, and
  (ii) one or more stakeholders of the online gaming platform;
 generate publication information of the first digital asset for publication on the fiat-currency-based online exchange platform, wherein the publication offers the first digital asset for the reversible exchange on the fiat-currency-based online exchange platform;

receive, from the fiat-currency-based online exchange platform, exchange information regarding the reversible exchange of the first digital asset for a benefit, wherein the benefit represents an amount of fiat currency that has been received by the fiat-currency-based online exchange platform from an exchanging user;

responsive to receipt of the exchange information, transfer a first set of instructions to the decentralized database to temporarily transfer the ownership of the first digital asset to the exchanging user, such that recorded rights on the decentralized database no longer reflect the ownership of the first digital asset by the first user;

receive reversibility information regarding one or more actions by the exchanging user;

make a determination whether to reverse the reversible exchange, wherein the determination is based on received reversibility information;

responsive to the determination indicating a reversal of the reversible exchange, transfer a second set of instructions to the decentralized database to transfer the ownership of the first digital asset back to the first user, such that the recorded rights on the decentralized database reflect the ownership of the first digital asset by the first user; and responsive to the determination indicating no reversal of the reversible exchange, clear the reversible exchange by:
(i) transferring a third set of instructions to the decentralized database to non-temporarily transferring the ownership of the first digital asset to the exchanging user, such that the recorded rights on the decentralized database reflect the ownership of the first digital asset by the exchanging user, and
(ii) distributing a first part of the benefit to the first user and a second part of the benefit to one or both of the second user and the one or more stakeholders of the online gaming platform in accordance with the asset-specific distribution rights, wherein the first part of the benefit is greater than the second part of the benefit.

12. The system of claim 11, wherein the one or more processors of the online gaming platform are further configured to:
facilitate interaction by the exchanging user with other users within the instance of the game, wherein the interaction includes user-controlled in-game actions by the first digital asset that are controlled by the exchanging user, wherein the interaction occurs subsequent to temporarily transferring the ownership of the first digital asset from the first user, and prior to the determination whether to reverse the reversible exchange.

13. The system of claim 12, wherein the interaction of the first digital asset within the instance of the game is limited to one or more types of in-game actions that exclude in-game actions that inflict damage to the first digital asset.

14. The system of claim 13, wherein the interaction of the first digital asset within the instance of the game is no longer limited to the one or more types of in-game actions that exclude in-game actions that inflict damage to the first digital asset, responsive to the determination indicating no reversal of the reversible exchange.

15. The system of claim 12, wherein the one or more processors of the online gaming platform are further configured to:
disable the interaction by the exchanging user, responsive to the determination indicating the reversal of the reversible exchange.

16. The system of claim 11, wherein the one or more processors of the automated electronic networked central clearinghouse are further configured to:
receive, from the first user and subsequent to transfer of the notification, authorization for the publication of the publication information on the fiat-currency-based online exchange platform.

17. The system of claim 11, wherein the first digital asset represents a three-dimensional in-game user-controllable character that can interact with other virtual items within the online gaming platform.

18. The system of claim 11, wherein the decentralized database is a blockchain.

19. The system of claim 11, wherein the one or more processors of the automated electronic networked central clearinghouse are further configured to:
receive, from the fiat-currency-based online exchange platform, the benefit.

20. The system of claim 11, wherein the first part of the benefit is greater than the second part of the benefit.

* * * * *